US011674449B2

(12) United States Patent
Weaver et al.

(10) Patent No.: US 11,674,449 B2
(45) Date of Patent: Jun. 13, 2023

(54) MOUNT ASSEMBLY FOR ACCESSORY GEARBOX OF AIRCRAFT ENGINE AND ASSOCIATED METHOD OF ASSEMBLY

(71) Applicant: PRATT & WHITNEY CANADA CORP., Longueuil (CA)

(72) Inventors: Paul Weaver, Chateauguay (CA); Krzysztof Gajowniczek, Rzeszow (PL); Mélanie Brillant, Saint-Amable (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/200,292

(22) Filed: Mar. 12, 2021

(65) Prior Publication Data

US 2022/0290615 A1 Sep. 15, 2022

(51) Int. Cl.
  *F02C 7/32* (2006.01)
  *F02C 7/36* (2006.01)
  *F01D 25/28* (2006.01)

(52) U.S. Cl.
  CPC .............. *F02C 7/32* (2013.01); *F02C 7/36* (2013.01); *F01D 25/28* (2013.01); *F05D 2220/323* (2013.01); *F05D 2220/50* (2013.01); *F05D 2230/60* (2013.01); *F05D 2240/91* (2013.01)

(58) Field of Classification Search
  CPC .... F02C 7/20; F02C 7/36; F01D 25/28; F16H 57/025; F05D 2220/50; F05D 2230/60; F05D 2240/91; F05D 2220/323
  See application file for complete search history.

(56) References Cited

U.S. PATENT DOCUMENTS

| | | | |
|---|---|---|---|
| 2,951,395 A * | 9/1960 | Smith | F02C 7/32 74/423 |
| 2,978,869 A * | 4/1961 | Hiscock | F02C 7/32 60/791 |
| 3,155,352 A | 11/1964 | Batt | |
| 3,543,588 A | 12/1970 | Richardson et al. | |
| 5,435,124 A * | 7/1995 | Sadil | F01D 25/285 248/220.21 |
| 6,260,351 B1 | 7/2001 | Delano et al. | |
| 9,500,133 B2 | 11/2016 | Davis et al. | |
| 10,012,149 B2 | 7/2018 | Jiang et al. | |
| 10,054,001 B2 | 8/2018 | Beutin et al. | |

(Continued)

FOREIGN PATENT DOCUMENTS

WO 2014011982 1/2014

OTHER PUBLICATIONS

William Sheridan and Kazem Kazerounian, "Design Optimization Study of Isolation Mount Systems for Gas Turbine Engine Accessories," GT2005-68048, ASME Turbo Expo 2005: Power for Land, Sea and Air Jun. 6-9, 2005. (Year: 2005).*

*Primary Examiner* — Todd E Manahan
*Assistant Examiner* — David P. Olynick
(74) *Attorney, Agent, or Firm* — Norton Rose Fulbright Canada LLP

(57) ABSTRACT

The relative position and orientation between an auxiliary gearbox and a casing of an aircraft engine can be set including engaging a localizing feature of the accessory gearbox with a localizing feature of the casing; and a load path between auxiliary gearbox can subsequently be defined including securing at least two brackets between the accessory gearbox and casing.

14 Claims, 6 Drawing Sheets

(56) References Cited

U.S. PATENT DOCUMENTS

| | | | |
|---|---|---|---|
| 2012/0304811 A1* | 12/2012 | Niggemeier | F02C 7/32 |
| | | | 74/606 R |
| 2016/0017811 A1 | 1/2016 | Martin et al. | |
| 2017/0260908 A1 | 9/2017 | Jiang et al. | |
| 2018/0023408 A1* | 1/2018 | Rice | F01D 11/08 |
| | | | 415/173.1 |
| 2019/0084134 A1* | 3/2019 | Abbott | B23B 31/1215 |

\* cited by examiner

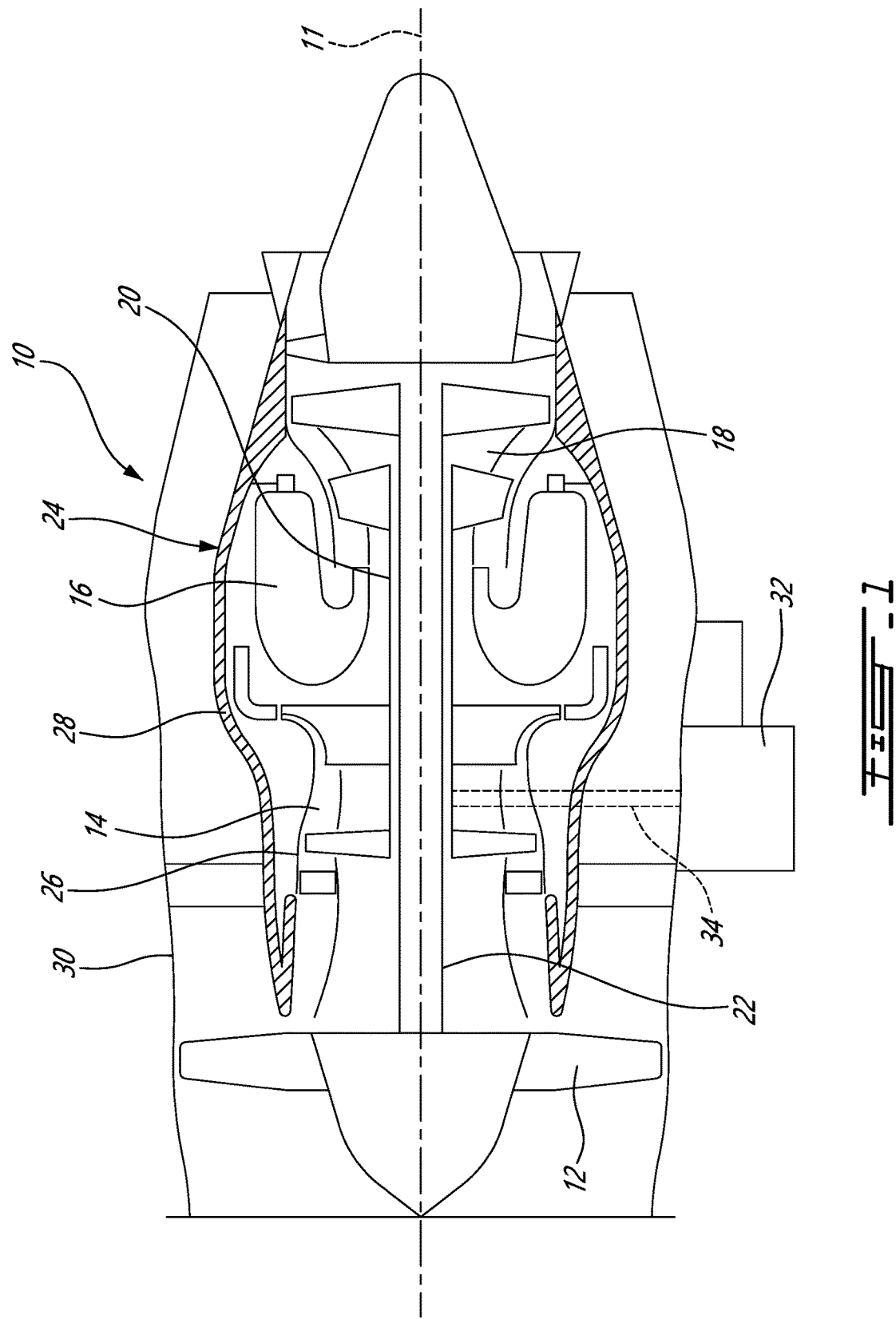

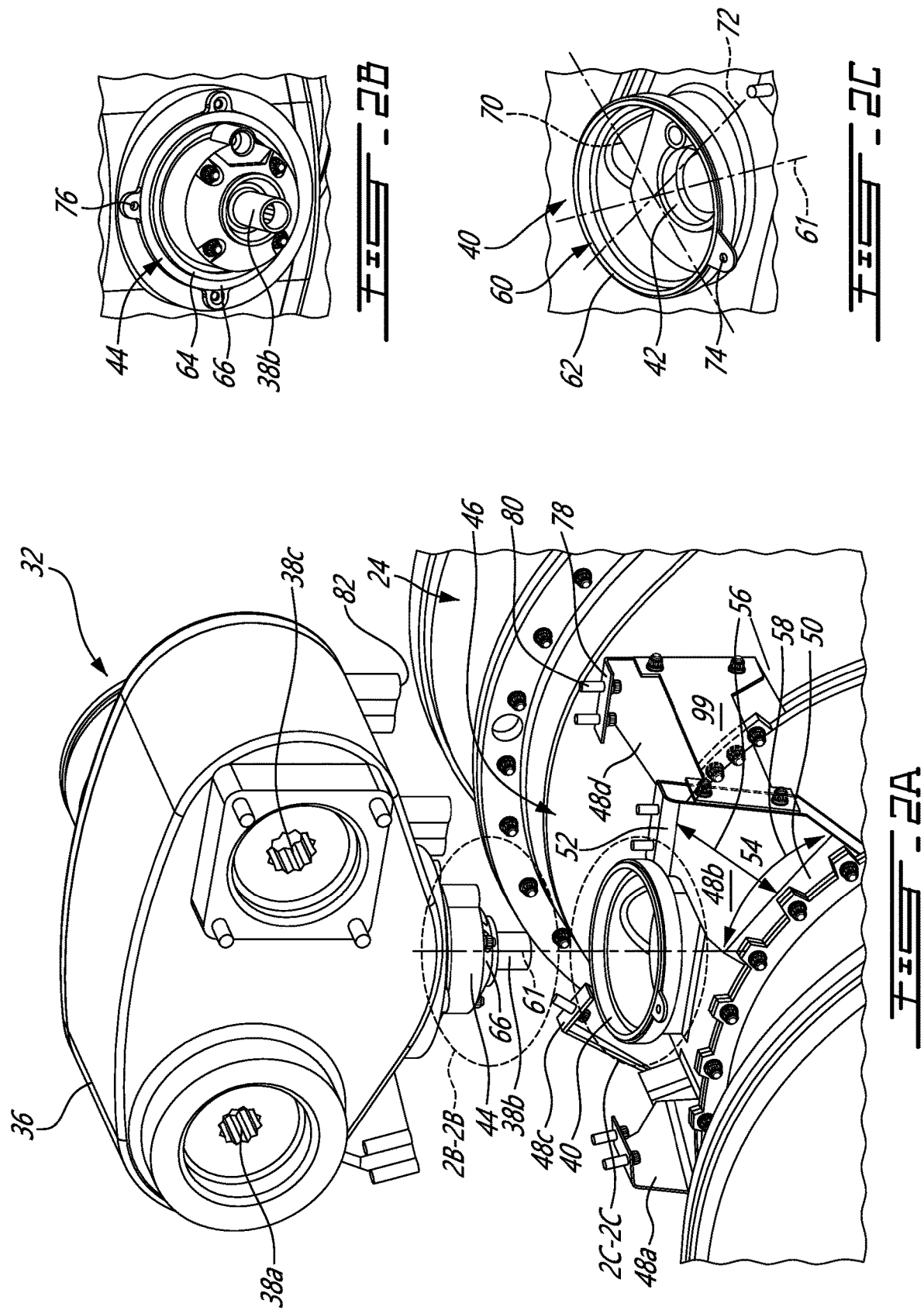

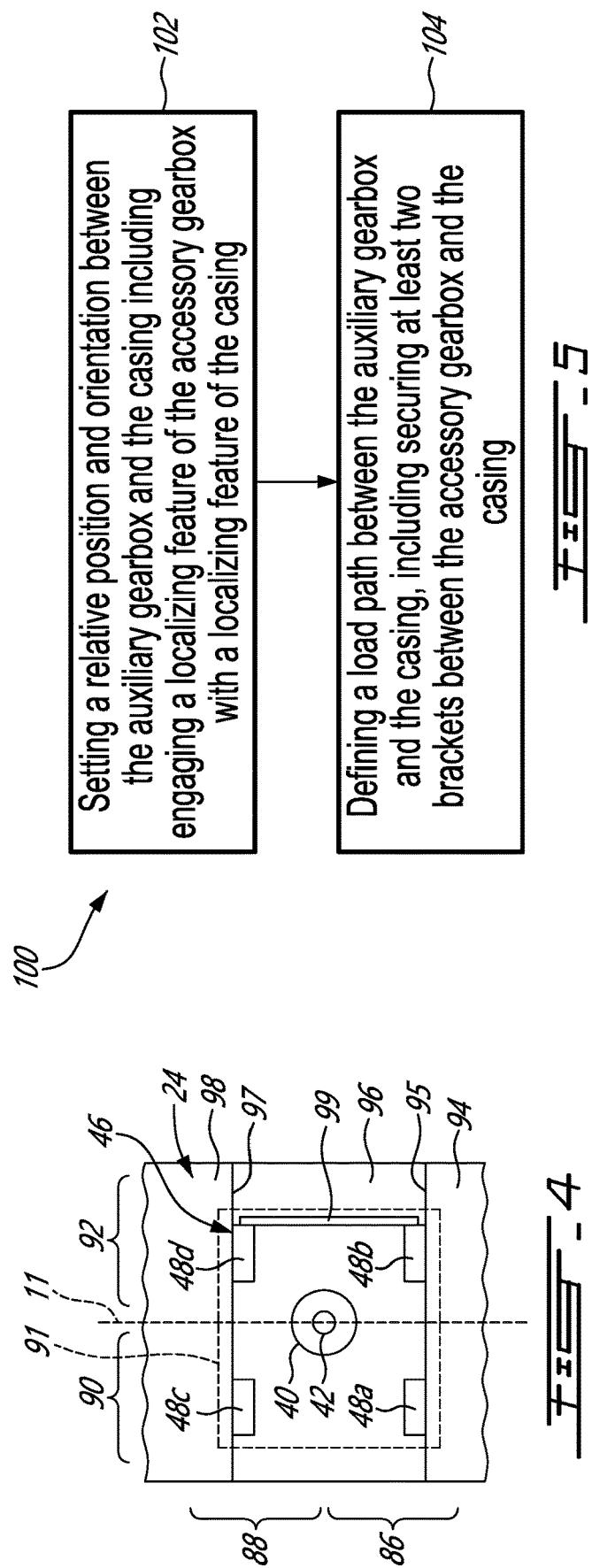

MOUNT ASSEMBLY FOR ACCESSORY GEARBOX OF AIRCRAFT ENGINE AND ASSOCIATED METHOD OF ASSEMBLY

TECHNICAL FIELD

The application relates generally to aircraft engines and, more particularly to techniques for mounting an accessory gearbox to the aircraft casing.

BACKGROUND OF THE ART

Aircraft engines typically have an accessory gearbox (AGB), sometimes alternately referred to as auxiliary gearbox or accessory drive, which can serve for exchanging power from the aircraft engine's core and "accessories". Accessory gearboxes typically provide for the connection to more than one accessory. The exact selection of accessories can vary from one engine to another, but it is relatively common for the accessories to include one or more fuel pump, oil pump, engine starter, etc, all of which can operate on the basis of power from the engine (except for the starter which rather operates to transfer power into the engine at startup). The accessory gearbox can be located externally from the engine's core to avoid the harsher temperatures therein, and be connected thereto by a radially-extending driveshaft. An AGB typically has more than one accessory ports associated to different functions, and the accessory ports are connected to the driveshaft port via gearing, either directly, or via other accessory ports.

Aircraft engine design factors in many different considerations such as power, fuel efficiency, reliability, production costs, maintenance costs, and weight. The design of the mechanical interface between the AGB and the engine's casing is also the subject of this challenge. Although known mechanical interface schemes were satisfactory to a certain degree, there always remains room for improvement.

SUMMARY

In one aspect, there is provided an aircraft engine comprising: a casing extending along and around an axis, the casing having a first localizing feature and a shaft aperture; an accessory gearbox having a second localizing feature and a driveshaft port, the second localizing feature engaged with the first localizing feature; a driveshaft extending radially relative the axis, through the shaft aperture, the driveshaft engaged with the driveshaft port; and at least two brackets including a first bracket having a proximal end secured to the casing on a first circumferential side and a first axial side relative the first localizing feature through at least one clearance hole, and a distal end having at least one first clearance hole, the first bracket fastened to the accessory gearbox through the at least one first clearance hole, and a second bracket having a proximal end secured to the casing on the first circumferential side and a second axial side relative the first localizing feature through at least one clearance hole, and a distal end having at least one second clearance hole, the second bracket fastened to the accessory gearbox through the at least one second clearance hole.

In another aspect, there is provided a method of mounting an accessory gearbox to a casing of an aircraft engine, the method comprising: setting the relative position and orientation between the auxiliary gearbox and the casing including engaging a localizing feature of the accessory gearbox with a localizing feature of the casing; and, defining a load path between auxiliary gearbox, including securing at least two brackets between the previously positioned and oriented accessory gearbox and casing.

In a further aspect, there is provided a mount assembly for defining a load path between an accessory gearbox and a casing of an aircraft engine which are relatively positioned and oriented relative one another, the mount assembly comprising: at least two brackets each having a unibody construction, including a first bracket having a proximal end securable to the casing and a distal end having at least one first clearance hole configured for fastening the first bracket to the accessory gearbox, and a second bracket having a proximal end securable to the casing and a distal end having at least one second clearance hole configured for fastening the second bracket to the accessory gearbox.

In a further aspect, there is provided an aircraft engine comprising: a casing extending along and around an axis, the casing having a first localizing feature and a shaft aperture; an accessory gearbox having a second localizing feature and a driveshaft port, the second localizing feature engaged with the first localizing feature; a driveshaft extending radially relative the axis, through the shaft aperture, the driveshaft engaged with the driveshaft port, a front and a rear defined in opposite directions from the driveshaft along the axis, a left side and a right side defined in opposite directions from the driveshaft in a lateral orientation transversal to the axis; a first bracket having a proximal end secured to the casing on a first one of the left side and right side and a first one of the front and the rear, and a distal end having at least one first clearance hole, the first bracket fastened to the accessory gearbox through the at least one first clearance hole, and a second bracket having a proximal end secured to the casing on the first one of the left side and right side and a second one of the front and the rear, and a distal end having at least one second clearance hole, the second bracket fastened to the accessory gearbox through the at least one second clearance hole.

DESCRIPTION OF THE DRAWINGS

Reference is now made to the accompanying figures in which:

FIG. 1 is a schematic cross-sectional view of a gas turbine engine;

FIG. 2A is an exploded view of an auxiliary gearbox and a receiving portion of an aircraft engine, in accordance with an embodiment;

FIGS. 2B and 2C show corresponding portions of FIG. 2A from other angles and enlarged.

FIG. 4 is a schematic top plan view of a receiving portion of the aircraft engine of FIG. 2A; and FIG. 5 is a flowchart of a method of mounting an auxiliary gearbox to a gas turbine casing, in accordance with an embodiment.

DETAILED DESCRIPTION

Figure 2D:
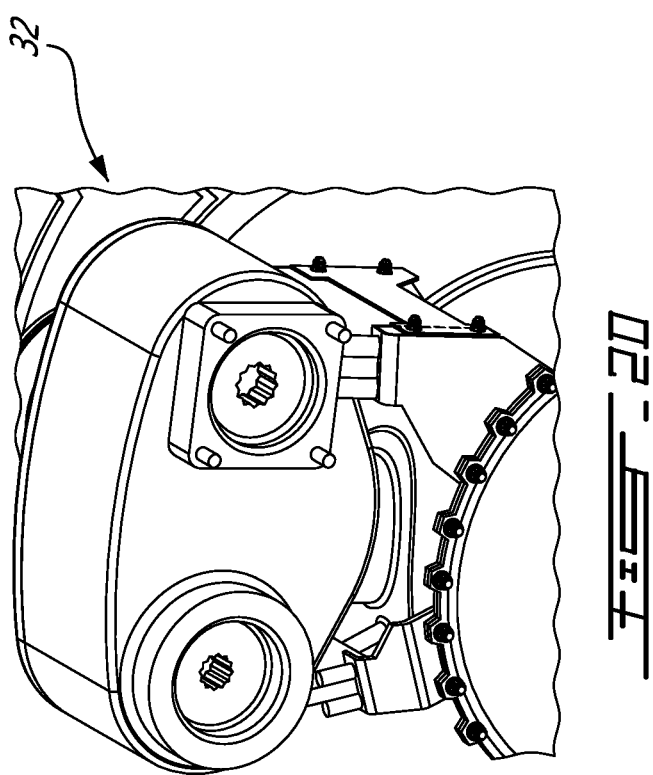
FIGS. 2D and 2E show the auxiliary gearbox of FIG. 2A assembled to the aircraft engine, from the rear and from the front, respectively.

FIG. 1 illustrates a gas turbine engine 10 of a type preferably provided for use in subsonic flight, generally comprising in serial flow communication along a main gas path a fan 12 through which ambient air is propelled, a compressor section 14 for pressurizing the air, a combustor 16 in which the compressed air is mixed with fuel and ignited for generating an annular stream of hot combustion gases around the engine axis 11, and a turbine section 18 for extracting energy from the combustion gases. The compressor 14, fan 12 and turbine 18 have rotating components which can be mounted on one or more shafts. The exact design varies from one engine type to another, but it is common for turbofan engines, for instance, to have one high pressure shaft 20, connecting a high pressure turbine section to the compressor 14, and a low pressure shaft 22, sometimes referred to as a power shaft, configured to deliver thrust. In the context of a turbofan engine, the low pressure shaft 22 can connect a lower pressure turbine section to the fan 12 (which can be considered a low pressure stage of the compressor). In turboshaft and turboprop engines, to name alternate examples of gas turbine engines, the design of the engine core (compressor section, combustor, turbine) can have many similarities with the illustrated design, but the power shaft leads to blades or a propeller, respectively, located outside the casing. Electric and hybrid aircraft engines can also have one or more shaft associated to corresponding rotors.

Aircraft engines have casings which can include a plurality of non-rotary components, and the exact design thereof can vary from one aircraft engine type to another. In the case of gas turbine engines or hybrid engines, the casing 24 typically has a radially-inner wall 26, relative the main axis 11, forming a radially outer delimitation to the main gas path, and can also have a radially outer wall 28. In the specific case of turbofan engines, the bypass duct 30 can be considered to form part of the casing 24, and forms a radially-outer delimitation to a bypass flow path extending around the engine core, the radially outer wall 28 forming here a radially-inner delimitation to the bypass flow path.

Aircraft engines typically have an accessory gearbox (AGB) 32 which can serve for exchanging power from the aircraft engine's core and "accessories". Accessory gearboxes 32 typically provide for the connection to more than one accessory. The exact selection of accessories can vary from one engine to another, but it is relatively common for the accessories to include one or more fuel pump, oil pump, engine starter, etc. The accessory gearbox 32 can be located externally to the casing 24, and somewhat remotely from the engine's core to avoid the harsh temperatures which can be sustained during operation of the higher pressure compressors, combustor 16, and turbine sections 18. Another motivation in the selection of a location of the AGB 32 externally to the casing would be presence of available space with access to the rotor(s), this can also affect the selection of the top or bottom position relative to the casing, for instance. The accessory gearbox 32 can be connected to transfer power to an engine shaft (e.g. shaft 20) by a radially-extending driveshaft 34. As better seen in the example presented in FIG. 2A, the AGB 32 can have a housing 36 with more than one accessory ports 38a, 38c associated to different accessories, and a driveshaft port 38b. The accessory ports 38a, 38c are connected to the driveshaft port 38b internally to the housing 36 via gearing, either directly, or via other accessory ports, such as by a train of spur gears interconnected to each other by idler gears (not shown, known in the art).

Given the presence of gearing, and especially in the case of multiple ports, AGBs 32 can be relatively heavy components. Their placement, especially when remote to the engine's main axis 11, can make them prone to dynamic effects, such as resonant vibration frequency response, in addition to more typical structural considerations. AGBs 32 typically have complex geometries, prompting their manufacture as a component which is initially separate from the casing 24 and drive shaft 34, to which it is designed to be interfaced to. The design of the mechanical interface between the housing 36 and the casing 24 may thus be required to take both dynamic and static effects in consideration.

Figure 2E:
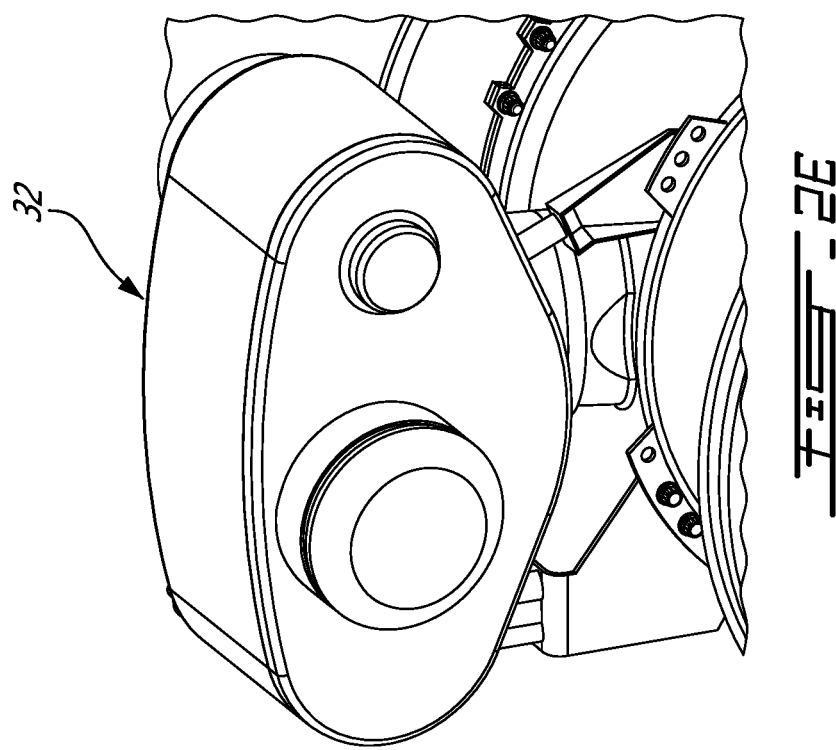

Turning now to FIG. 2A, an example embodiment of a mechanical interface between an AGB 32 and a casing 24 will now be described. It will be noted that in this embodiment, the localizing function of the mechanical interface can be partially or fully decoupled from the load path function. More specifically, the localizing function is performed by a combination of a first localizing feature 40 which is provided as part of the casing 24, in association with a shaft aperture 42, and a second localizing feature 44 which is provided as part of the AGB 32, in association with the driveshaft port 38b. The first localizing feature 40 and shaft aperture 42 are better shown on FIG. 2C, whereas the second localizing feature 44 and driveshaft port 38b are better shown on FIG. 2B. FIG. 2A presents the AGB 32 and the casing 24 prior to engagement of the first localizing feature 40 with the second localizing feature 44, the engaged position, wherein the relative position and orientation has been set, being shown in FIGS. 2D and 2E. In the engaged configuration, the driveshaft 34 extends through the shaft aperture 42 and is engaged with the driveshaft port 38b.

In this embodiment, the load path function can be fully decoupled from the localizing function, and be performed by a mount assembly 46 including a plurality of brackets 48a, 48b, 48c, 48d. All the brackets 48a, 48b, 48c, 48d can be of a unibody construction, such as by being formed of a single component without any articulations therein. The brackets 48a, 48b, 48c, 48d can each have a first end, which can conveniently be referred to as the proximal end 50, secured to the casing 24, and a distal end 52 configured for engagement with the AGB 32. A body 54 of each bracket 48a, 48b, 48c, 48d extends between the proximal end 50 and the distal end 52, and the body 54 can extend to a certain extent radially 56 and circumferentially 58 relative the engine axis 11.

Figure 2G:
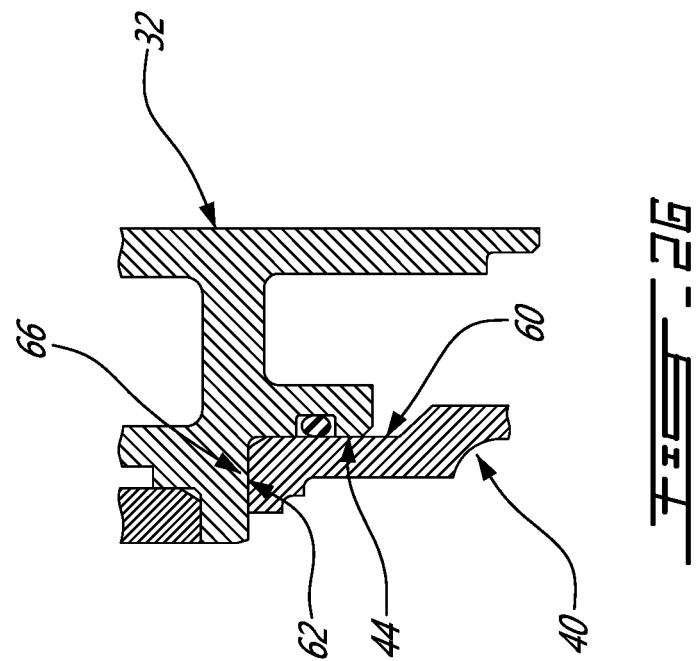
FIGS. 2F and 2G are cross-sectional views showing the engagement between locating features.
Figure 2F:
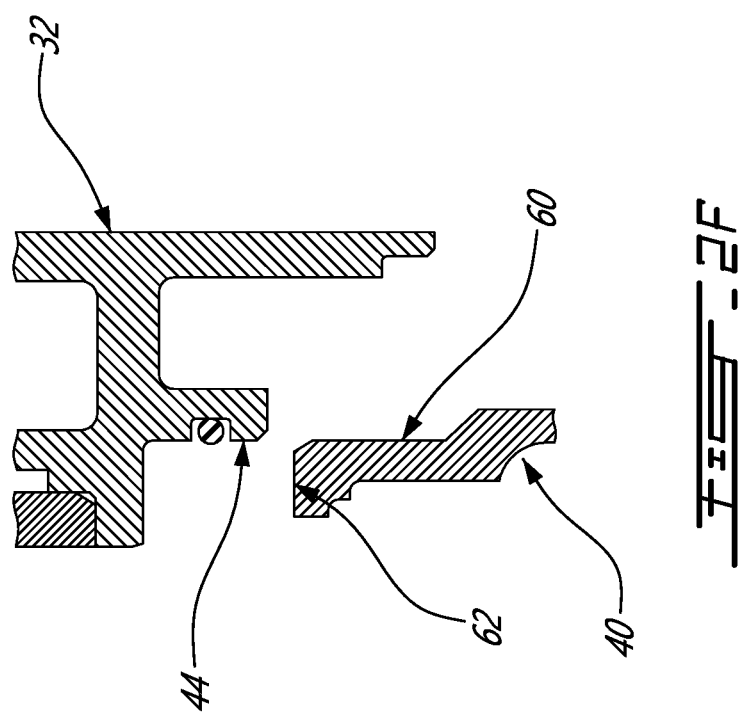

In FIG. 2A, the brackets 48a, 48b, 48c, 48d have their proximal end 50 loosely secured to the casing 24, and the distal end 52 is left free. The relative orientation and position between the AGB 32 and the casing 24 is set here entirely independently from the use of the brackets 48a, 48b, 48c, 48d, and the brackets 48a, 48b, 48c, 48d can be devoid of localizing features. For instance, in this embodiment, the first localizing feature 40 can have a peripheral flange 60 extending around the driveshaft axis 61, in the orientation of a length of the drive shaft 34 (radial orientation relative the main axis 11), and can have a tip 62 forming a length-wise (radial) delimitation to the peripheral flange 60. The second localizing feature 44 can have a male member 64 sized for snugly engaging the flange 60, and sliding lengthwisely, in the orientation of the driveshaft axis 61, (radially) along the peripheral flange 60 until the tip 62 thereof abuts against an axial seat 66. FIGS. 2F and 2G illustrate the engagement of the first localising feature 40 with the second localizing feature 44, in accordance with one embodiment, where a seal, such as an O-ring, is provided between the flange 60 and the male member 64 to prevent any leakage therebetween.

The flange 60 and the outer wall of the male member 64 can both have a corresponding circular cross-section and form a spigot arrangement. The flange 60/seat 62/male member 64 engagement can serve to set the relative position of the AGB 32 and casing 24 within the plane of the flange, i.e. a plane normal to the driveshaft axis 61, and the length of the flange 60 in the orientation of the driveshaft axis 61 can set the relative orientation of the AGB 32 and casing 24 around two orthogonal axes 70, 72 located in the plane of the flange 60. The engagement between the seat 66 of the male member 64 and the tip 62 can set the relative position between the AGB 32 and the casing 24 along the driveshaft axis 61. When the male member 64 can rotate relative to the flange 60 around the driveshaft axis 61, clocking features can additionally be provided, such as a hole 74 and bore 76 with a pin or bolt, for instance, to lock the relative orientation between the AGB 32 and the casing 24 around the driveshaft axis 61, thereby fully localizing the AGB relative to the casing 24 in all 6 degrees of freedom. Indeed, the localizing function can be entirely played by the circular seat, which here provides for circumferential, axial, and in-plane localization. The above details are provided in association with one example only, and it will be understood that several alternate configurations are possible in alternate embodiments.

The relative positioning and relative orientation between the AGB 32 and the casing 24, set with the engagement between the first localizing feature 40 and the second localizing feature 44, can be the subject of a tolerance stackup which can affect the exact relative position of the free distal ends 52 of the brackets 48a, 48b, 48c, 48d relative the corresponding portions of the AGB 32. To accommodate this potential assembly tolerance stackup, the distal ends 52, proximal ends 50, or both the distal ends 52 and the proximal ends 50 can be provided with one or more clearance holes 78 designed to accommodate the shafts of corresponding fasteners 80. In the illustrated embodiment, both the distal ends 52 and the proximal ends 50 have clearance holes 78 having a similar design, the proximal end 50 clearance holes 78 accommodate vertical and lateral assembly tolerances and the distal end 52 clearance holes 78 accommodate the axial and lateral assembly tolerances. To this end, the clearance holes 78 of the proximal ends can be axially-oriented, whereas the clearance holes 78 of the distal ends 52 can be upwardly or radially-oriented, for instance. In other words, the orientation of the clearance holes 78 of the distal ends 52 and the clearance holes 78 of the proximal ends 50 can be different, ideally orthogonal to one another, to provide for adapting to assembly tolerance stackup in all orthogonal orientations.

A degree of clearance c of a given hole 78 is defined by its difference with the diameter of the shaft of the corresponding fastener 80. As opposed to close tolerance, or localizing holes, which are designed with minimal play, or even interference with the shaft, clearance holes 78 will be designed larger than the shaft of the fastener 80 which they are designed to accommodate. For instance, as presented in FIG. 3D, the clearance hole 78 can have a greater diameter than the diameter of the shaft 80, and the clearance c can be defined as the difference between the two taken from a perfectly centered configuration. As varying tolerance stackups will affect the relative positioning between the clearance holes 78 and the corresponding threaded bores 82 of the AGB 32 from one manufactured engine instance to the other, the clearance c provides a corresponding degree of freedom for the corresponding fastener's shaft 80. The load path can be completed once the fastener heads 84 sandwich the portion of the bracket ends surrounding the corresponding clearance holes c against the corresponding portion of the AGB's housing 32 or case 24 either directly, or indirectly (e.g. via a washer or other element). The fastener heads 84 can transfer, by direct contact, any load components aligned to axis 61, while the load component aligned to axis 70 and 72 is transferred by friction force caused by fasteners preload.

Figure 3B:
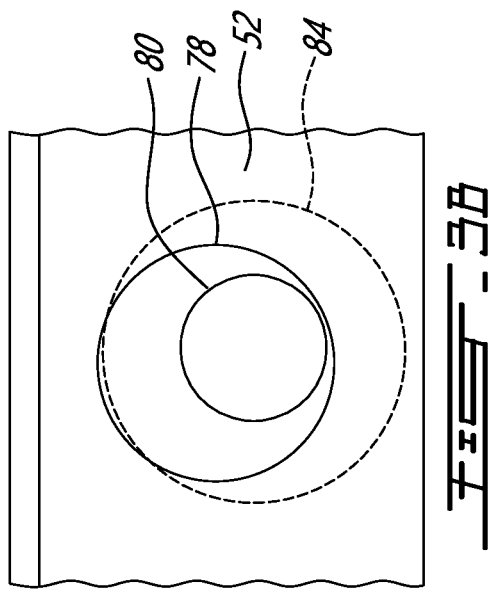
FIGS. 3A and 3B are schematic views showing two example positions in which a fastener shaft can ultimately engage the clearance hole, depending on a given embodiment's exact dimensions within the assembly tolerance stackup.
Figure 3D:
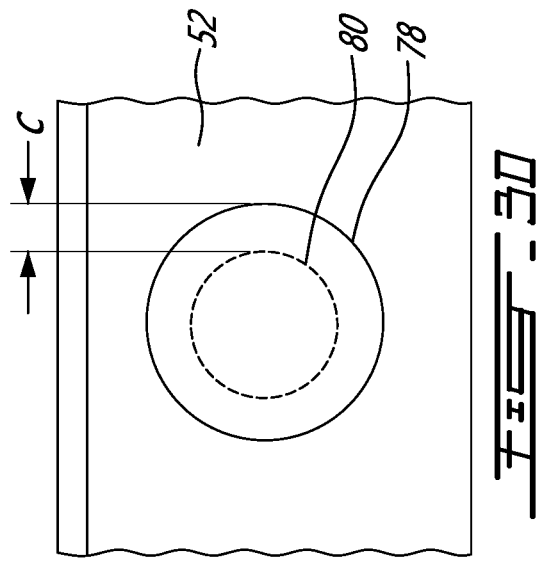
FIG. 3D is a schematic view illustrating the clearance afforded by a clearance hole.
Figure 3A:
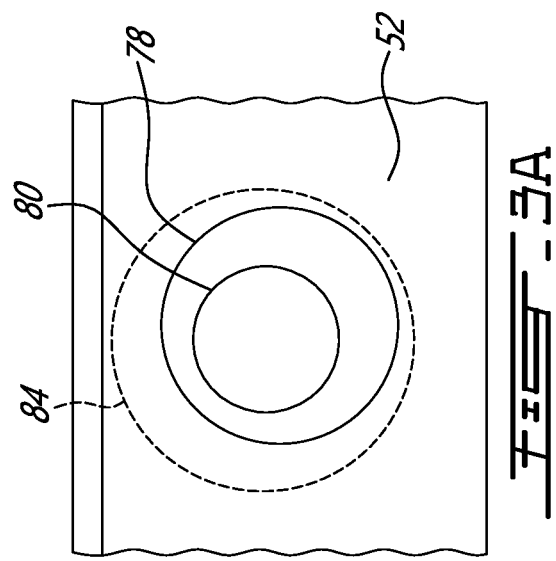
Figure 3C:
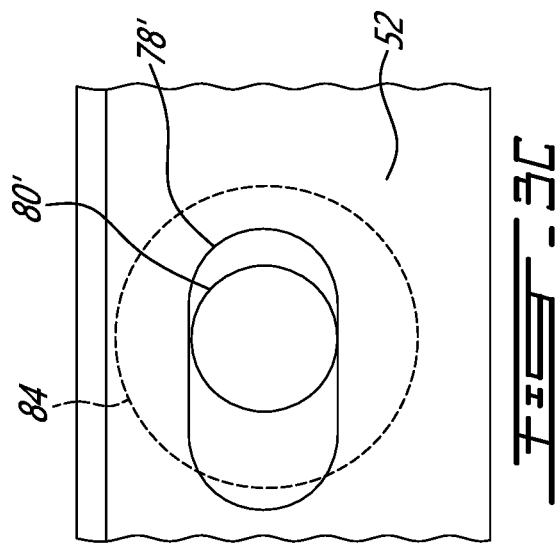
FIG. 3C is a schematic view showing an alternate shape of a clearance hole.

FIGS. 3A and 3B show two example positions in which the fastener shaft 80 can ultimately engage the clearance hole 78, depending on the embodiment's exact dimensions within the assembly tolerance stackup. FIG. 3C shows an example of a clearance hole 78' which is obround, and adapted to provide a greater degree of clearance in one orientation than in a transverse orientation. Such fastener and clearance hole arrangements can be used at the distal ends 52, at the proximal ends 50 or both, and are used in both the distal ends 52 and the proximal ends 50 in the embodiment illustrated in FIG. 2A.

The brackets can be thinner in the axial orientation than in the radial 56 and circumferential 58 orientations, and remain somewhat flexible in the axial orientation while the distal ends 52 remain free. If the brackets 48a, 48b, 48c, 48d are flexible by hand before securing the distal end 52 to the AGB 32, such as by bending one or both the distal ends 52 of two axially opposite brackets 48a, 48c towards or away from the other, the designer's final selection of clearance c can factor in this flexibility. Indeed, in such a case, it can be assumed that even though the clearance c is not sufficient to accommodate the assembly's tolerance stackup in the axial orientation in and of itself, a certain degree of axial misalignment between the clearance hole 78 and the threaded bore's 82 axis (which corresponds to the ultimate position of the fastener) can be accounted for by bending the brackets 48a, 48b, 48c, 48d within the elastic deformation domain. It will be noted that in the specific embodiment presented in FIG. 2A, each one of the brackets 48a, 48b, 48c, 48d has two clearance holes 78 defined therein. In alternate embodiments, some or all of the brackets 48a, 48b, 48c, 48d can have a single clearance hole 78, or more than two clearance holes 78, to name some examples. The initially loosely located brackets 48a, 48b, 48c, 48d take their final, closely fitting, position only after securing via the fasteners 80, at which point the localizing features can become entirely decoupled from the load path from the point of view of rigidity and structure.

The embodiment presented in FIG. 2A shows a configuration where the accessory gearbox 32 is provided at a top of the casing 24, as opposed to embodiments such as presented in FIG. 1 where the accessory gearbox can be provided instead at a bottom of the casing. Depending on the specificities of given embodiments, the mount assembly 46 can have two or more brackets 48a, 48b, 48c, 48d. In the embodiment illustrated, as perhaps best seen on FIG. 4, the mount assembly 46 includes four brackets 48a, 48b, 48c, 48d, a first and a second brackets 48a, 48b, being provided on a first axial side 86 (e.g. front or rear) relative the driveshaft aperture 42 (and the engaged localizing features 40, 44), and a third and a fourth brackets 48c, 48d being provided on a second axial side 88. The first and the third brackets 48a, 48c are provided on a first circumferential (or lateral) side 90 relative the driveshaft aperture 42/engaged localizing features 40, 44, and the second and the fourth brackets 48b, 48d are provided on a second circumferential side 92. Such an arrangement can allow the brackets 48a, 48b, 48c, 48d, once the distal ends 52 of which are fastened to the accessory gearbox 32, to entirely define the load path between the auxiliary gearbox and the casing 24, in the sense that the rigidity of the structure formed by the engagement of the localizing features 40, 44 can be insignificant, or otherwise very small compared to the rigidity of the structure formed by the fully secured brackets 48a, 48b, 48c, 48d. In alternate embodiments, a similar objective may be achieved by using three brackets instead of four, for instance. In still other embodiments, it may be preferred for the load path to partially extend via the engaged localization features 40, 44, which can imply fastening or otherwise securing the engaged localization features, or the vicinity of the engaged localization features, to one another, and in such embodiments, it may be preferred to use only two or three brackets for instance.

The way by which the proximal end 50 of the brackets 48a, 48b, 48c, 48d is secured to the casing 24 can depend on the specifics of the embodiment. In the embodiment shown in FIG. 2A and FIG. 4, for instance, the casing 24 has a sequence of three (or more) sections 94, 96, 98 which all extend circumferentially around the main axis 11, and which all extend along the axis 11. These sections 94, 96, 98 include a first section 94 secured to a second section 96 at a first structural flange arrangement 95, and a third section 98 secured to the second section 96 at a second structural flange arrangement 97. In alternate embodiments, one or both of the structural flange arrangements may be omitted, or formed as part of a given casing section rather than forming a connector between two casing sections, for instance. In the illustrated embodiment, the first and second structural flange arrangement 95, 97 can include annular flanges protruding radially from a corresponding end of a corresponding section and extending circumferentially around the main axis 11. The two corresponding flanges can be secured to one another by fasteners or the like. The structural flange arrangements 95, 97 can provide a greater rigidity of structure than a cylindrical wall portion of the casing 24 which extends between the flange arrangements 95, 97. This additional structure can be harnessed in securing the AGB 32. In this example, the second section 96 is the one to which the AGB 32 is mounted, and which bears both the localizing feature 40 and the shaft aperture 42.

The exact shape and configuration of the brackets 48a, 48b, 48c, 48d can change from one bracket to another, and also from one embodiment to another, and can be affected by the manufacturing technique which is ultimately retained by the designer. In the embodiment of FIG. 2A, for example, the brackets 48a, 48b, 48c, 48d are made of folded sheet metal where more specifically, the distal end 52 is folded into an axially-oriented flange through which the clearance hole(s) 78 are defined. The proximal end 50 can extend unfolded and be sandwiched with the corresponding structural flange arrangement 95, 97 via fasteners or the like. In other embodiments, it can be preferred to cast, 3D print, machine from solid, or fabricate the brackets, for instance. Perhaps especially in a sheet-metal construction configuration such as presented in FIG. 2A, the body 54 of the brackets 48a, 48b, 48c, 48d which extends between the proximal end 50 and the distal end 52 can extend to a significantly greater extent radially 56 and circumferentially 58 than axially 11. This can result in brackets 48a, 48b, 48c, 48d which are significantly more resistant to stresses occurring in the radial 56 or circumferential 58 orientations than to stresses occurring in the axial orientation 11, which may be suitable for some embodiments. In the embodiment illustrated, it was preferred to provide a structural web 99 extending axially between two of the brackets 48b, 48d which are axially aligned with one another, and to secure the structural web 99 to both these brackets 48b, 48d. This was found to provide significantly greater resistance of the resulting mount assembly 46 to stresses exhibited in the axial orientation 11, especially when the web 99 further extends to a certain extent in the radial orientation 56. It was found possible to tune the dynamic frequency response of the mounting structure 46 in the illustrated embodiment simply by changing the thickness of the sheet metal used to form some or all of the brackets 48a, 48b, 48c, 48d and web 99. The web 99 can be fastened to corresponding ones of the brackets 48a, 48b, 48c, 48d via clearance holes 78 as well, to accommodate assembly tolerance stackup along the axial orientation, for instance. A single web 99 was considered sufficient in the illustrated embodiment, though it will be understood that in alternate embodiments, structural webs can be used between both the first and third 48a, 48c, and second and fourth 48b, 48d brackets, or entirely omitted. It will be noted that with the proposed mount assembly 46 configuration, the load path can have a footprint 91 which can be of a significantly greater surface area than the footprint of the localizing features 40, 44, which can be suitable from the point of view of addressing static and/or dynamic loads.

Accordingly, using a mechanical interface between the accessory gearbox 32 and the casing 24, including a mounting structure 46 and localizing features 40, 44 such as presented above, a method 100 of mounting an accessory gearbox 32 can be represented as shown in FIG. 5, and include a step 102 of setting the relative position and orientation between the auxiliary gearbox 32 and the casing 24 including engaging a localizing feature 44 of the accessory gearbox 32 with a localizing feature 40 of the casing 24; and a step 104 of defining a load path between the auxiliary gearbox 32 and the casing 24, including securing at least two brackets 48a, 48b, 48c, 48d between the positioned and oriented accessory gearbox 32 and the casing 24. It will be noted that defining the load path can include engaging fasteners through clearance holes 78 formed in the at least two brackets 48a, 48b, 48c, 48d, and tightening said fasteners 80 into threaded bores 82 formed in the auxiliary gearbox 32. Setting the relative position and orientation can include engaging a circular male feature 64 of the auxiliary gearbox 32 into a circular flange 60 of the casing until a seat 66 of the circular male feature 64 engages a tip 62 of the circular flange 60. This can include clocking the auxiliary gearbox 32 including rotating the male feature 64 within the circular flange 60 and locking its circumferential orientation. Defining the load path can further include decoupling the load path from the engaged localizing features 40, 44. Moreover, defining the load path can include bending a distal end 52 of one or more of the brackets 48a, 48b, 48c, 48d in the axial orientation, within the elastic deformation domain. In embodiments where the brackets can be bent in the elastic domain in one or more orientations, clearance c may not be required between the holes 78' and the shafts 80' in that or those orientations.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, in one embodiment, a circular flange can be used to constrain both transversal and radial alignment, and an additional feature can be used to constrain circumferential rotation within the socket formed by the flange, such as a radially oriented locating hole. These features can form a circular seat which can provide for circumferential, axial, and in-plane localization. Different configurations can be used in alternate embodiments. In one embodiment, the casing section can also be made of sheet metal, but this is optional and can be omitted in other embodiments. In some embodiments, the holes can interface the major plane of the bracket at 90 degrees, and can be provided without any shims or rigging, and the brackets can be monolithic and provided without hinge joints, holes or shims. In some alternate embodiments, the locating features can be pins and mating holes instead of a flange and male member, for instance, and the male and female members can be inversed, i.e. the male feature(s) can be provided as part of the casing and the female feature(s) can be provided as part of the AGB. Various types of fasteners can be used to secure the brackets to the AGB and/or casing in different embodiments, such as studs protruding from the AGB secured by nuts, screws, bolts, etc. Yet further modifications could be implemented by a person of ordinary skill in the art in view of the present disclosure, which modifications would be within the scope of the present technology.

The invention claimed is:

1. An aircraft engine comprising:
a casing extending along and around an axis, the casing having a first localizing feature and a shaft aperture;
an accessory gearbox having a second localizing feature and a driveshaft port, the second localizing feature engaged with the first localizing feature;
a driveshaft extending radially relative the axis, through the shaft aperture, the driveshaft engaged with the driveshaft port, a front and a rear defined in opposite directions from the driveshaft along the axis, a left side and a right side defined in opposite directions from the driveshaft in a lateral orientation transversal to the axis;
a first bracket having a proximal end secured to the casing on a first one of the left side and right side and a first one of the front and the rear, and a distal end having a first clearance hole, the first bracket fastened to the accessory gearbox by a first fastener having a first shaft extending through the first clearance hole, a first clearance being defined by a difference between a size of the first clearance hole and a size of the first shaft, the first clearance providing a degree of freedom for movement of the first shaft in the first clearance hole, and
a second bracket having a proximal end secured to the casing on the first one of the left side and right side and a second one of the front and the rear opposite the first one of the front and the rear, and a distal end having a second clearance hole, the second bracket fastened to the accessory gearbox by a second fastener having a second shaft extending through the second clearance hole, a second clearance being defined by a difference between a size of the second clearance hole and a size of the second shaft, the second clearance providing a degree of freedom for movement of the second shaft in the second clearance hole;
wherein the casing has a sequence of at least three sections each extending circumferentially around the axis, including a first section secured to a second section at a first structural annular flange arrangement, a third section secured to the second section at a second structural annular flange arrangement, the second section having the shaft aperture and the first localizing feature, the proximal end of the first bracket secured to the first structural annular flange arrangement, the proximal end of the second bracket secured to the second structural annular flange arrangement, the first structural annular flange arrangement and the second structural flange arrangement extending circumferentially around the axis
wherein a relative position between the distal end of the first bracket and the distal end of the second bracket is determined from an assembly tolerance stackup set by the engagement between the first localizing feature and the second localizing feature, the first clearance and the second clearance configured to accommodate the assembly tolerance stackup.

2. The aircraft engine of claim 1 wherein the proximal end of the first bracket has a third clearance hole, the first bracket fastened to the casing through the third clearance hole, the third clearance hole being defined in a different orientation than the first clearance hole, the proximal end of the second bracket has a fourth clearance hole, the second bracket fastened to the casing through the fourth clearance hole, the fourth clearance hole being defined in a different orientation than the second clearance hole.

3. The aircraft engine of claim 1 wherein the casing has a top and a bottom defined in opposite directions from the axis along a height orientation, the height orientation being transversal to the axis and to the lateral orientation, the accessory gearbox being at the top of the casing.

4. The aircraft engine of claim 1 further comprising a structural web extending axially between the first bracket and second bracket, the structural web being secured to both the first bracket and the second bracket.

5. The aircraft engine of claim 1 wherein the first bracket and the second bracket each have a body extending both radially and circumferentially relative the axis.

6. The aircraft engine of claim 5 wherein the distal end of the first bracket and the distal end of the second bracket each have a corresponding flange extending circumferentially and axially relative to the axis, said first clearance hole and said second clearance hole being defined through said corresponding flange.

7. The aircraft engine of claim 1 further comprising a third bracket having a proximal end secured to the casing on a second one of the left side and the right side opposite the first one of the left side and the right side, and a distal end having a third clearance hole, the third bracket fastened to the accessory gearbox via the third clearance hole.

8. The aircraft engine of claim 7 wherein a load path between the auxiliary gearbox and the casing is mainly defined via the brackets.

9. The aircraft engine of claim 1 wherein the first localizing feature has a peripheral flange and a tip forming a length-wise delimitation to the peripheral flange, the second localizing feature has a male member and an axial seat, the male member slidable along the peripheral flange until the tip of the peripheral flange abuts against the seat, and the shaft aperture is formed internally to a periphery of the peripheral flange.

10. The aircraft engine of claim 9 wherein the peripheral flange is circular in a plane transversal to an orientation of a length of the driveshaft, wherein the first localizing feature and the second localizing feature further comprise a clocking feature configured for setting the relative circumferential orientation of the male member within the peripheral flange.

11. The aircraft engine of claim 1 wherein the axis is a main axis, the driveshaft extending along a driveshaft axis, the first localizing feature and the second localizing feature engaged along the driveshaft axis, the engagement of the first localizing feature and of the second localizing feature setting a relative position and orientation of the accessory gearbox relative the casing in a plane normal to the driveshaft axis.

12. The aircraft engine of claim 11 wherein the first localizing feature has a peripheral flange, the second localising feature has a male member, one of the peripheral flange and the male member has a tip, the other one of the peripheral flange and the male member has a seat, the male member slidable in the orientation of the driveshaft axis along the peripheral flange until the tip abuts the seat.

13. The aircraft engine of claim 1 wherein the first bracket forms part of a load path between the accessory gearbox and the casing; the second bracket forms part of the load path, the load path decoupled from said engagement of the first localizing feature and of the second localizing feature.

14. The aircraft engine of claim 1 wherein both the first bracket and the second bracket are of a unibody construction, formed of a single component without any articulations.

* * * * *